(12) United States Patent
Yokoi

(10) Patent No.: US 8,998,140 B2
(45) Date of Patent: Apr. 7, 2015

(54) WINDOW OF AIRCRAFT, CLOSING MEMBER FOR OPENING AND GASKET SEAL

(75) Inventor: Takashi Yokoi, Aichi (JP)

(73) Assignee: Mitusbishi Aircraft Corporation, Aichi (JP)

( * ) Notice: Subject to any disclaimer, the term of this patent is extended or adjusted under 35 U.S.C. 154(b) by 110 days.

(21) Appl. No.: 13/560,388

(22) Filed: Jul. 27, 2012

(65) Prior Publication Data

US 2013/0062468 A1 Mar. 14, 2013

(30) Foreign Application Priority Data

Sep. 14, 2011 (JP) .................. 2011-200692

(51) Int. Cl.
*B64C 1/14* (2006.01)
*B60J 10/00* (2006.01)
*B64D 45/00* (2006.01)

(52) U.S. Cl.
CPC ......... *B64C 1/1492* (2013.01); *B64D 2045/006* (2013.01); *B60J 10/0005* (2013.01)

(58) Field of Classification Search
USPC ............... 244/129.3, 129.4; 174/351, 358
See application file for complete search history.

(56) References Cited

U.S. PATENT DOCUMENTS 3,592,479 A * 7/1971 Andresen ............... 277/373
4,780,575 A * 10/1988 Flavin et al. ............ 174/358
4,823,229 A * 4/1989 Waterland, III ......... 361/218
4,968,854 A * 11/1990 Benn et al. ............. 174/354
5,277,384 A 1/1994 Webb
(Continued)

FOREIGN PATENT DOCUMENTS

EP 0 303 349 A2 2/1989
EP 0303349 A2 * 2/1989 ............... B64C 1/14
(Continued)

OTHER PUBLICATIONS

Zhang, Jie and Feng, Shengyu, "Effect of Crosslinking on the Conductivity of Conductive Silicone Rubber," Journal of Applied Polymer Science, vol. 89, 3471-3475 (2003), received Apr. 1, 2002, accepted Jan. 11, 2003.*

(Continued)

*Primary Examiner* — Valentina Xavier
*Assistant Examiner* — Alexander V Giczy
(74) *Attorney, Agent, or Firm* — Pearne & Gordon LLP

(57) ABSTRACT

An electromagnetic shield mesh 25 is provided on a window part 21, and a gasket seal 50 is provided between the electromagnetic shield mesh 25 and a window frame 30 made of a conductive material. The first seal part 51 of the gasket seal 50 has a low volume resistivity, and makes it possible to prevent electromagnetic noise from entering the inside of an airframe between the window part 21 and a window frame 30. Moreover, the second seal part 52 of the gasket seal 50, which is made in contact with the electromagnetic shield mesh 25 of the window part 21 on the outer perimeter side of window panels 23A and 23B, has a volume resistivity of, for example, 300 Ωcm or more, so that it becomes possible to prevent corrosion from occurring at contact portions with a clamp 28, a clip 29 or the like.

15 Claims, 5 Drawing Sheets

(56) References Cited

U.S. PATENT DOCUMENTS

| | | | |
|---|---|---|---|
| 5,294,373 A * | 3/1994 | Takahashi et al. | 252/502 |
| 5,524,908 A * | 6/1996 | Reis | 277/654 |
| 6,410,846 B1 * | 6/2002 | Benn, Jr. | 174/391 |
| 6,787,221 B2 * | 9/2004 | Botrie et al. | 428/304.4 |
| 7,118,070 B2 * | 10/2006 | Abrams et al. | 244/129.3 |
| 7,913,385 B2 | 3/2011 | Carlson et al. | |
| 7,976,927 B2 * | 7/2011 | Tanaka et al. | 428/119 |
| 2004/0094906 A1 * | 5/2004 | Gentemann et al. | 277/637 |
| 2004/0168380 A1 * | 9/2004 | Olson et al. | 52/204.5 |
| 2005/0039936 A1 * | 2/2005 | Hikita et al. | 174/35 R |
| 2007/0137117 A1 | 6/2007 | Carlson et al. | |
| 2008/0208677 A1 * | 8/2008 | Mayr et al. | 705/10 |
| 2008/0308677 A1 | 12/2008 | Kirchoff et al. | |
| 2010/0078897 A1 * | 4/2010 | McPeek et al. | 277/637 |

FOREIGN PATENT DOCUMENTS

| | | |
|---|---|---|
| JP | 2003-523911 A | 8/2008 |
| WO | 00-66426 A1 | 4/2000 |

OTHER PUBLICATIONS

Jie Zhang and Shengyu Feng, "Effect of Crosslinking on the Conductivity of Conductive Silicone Rubber," Journal of Applied Polymer Science, vol. 89, 3471-3475 (2003), Jan 11, 2003.*

European Search Report for Application 12178442.5-1254 dated Nov. 22, 2012.

* cited by examiner

WINDOW OF AIRCRAFT, CLOSING MEMBER FOR OPENING AND GASKET SEAL

BACKGROUND OF THE INVENTION

1. Field of the Invention

The present invention relates to a window of an aircraft having an electromagnetic shield and a closing member for an opening, and also relates to a gasket seal for use therein.

2. Description of the Related Art

Aircraft have to be able to fly in safety without occurrence of a malfunction, an unforeseen behavior (up-set), or others in High Intensity Radiated Fields (HIRF), which represents an electro-magnetic environment from radio, television, radar, emitters, and other sources during cruising flight or during takeoff or landing. To this end, HIRF protection measures required in (14 CFR) sections 23.1308, 25.1317, 27.1317, and 29.1317 of High-intensity Radiated Fields (HIRF) protection, which stipulate regulations (airworthiness requirements) of Federal Aviation Administration (FAA), have to be taken.

The importance of protection of electric/electronic systems of aircraft has been significantly increasing in recent years for the following reasons:
1) a greater dependence on electric/electronic systems performing functions required for continued safe flight and landing of the aircraft;
2) a decrease in electromagnetic shielding by a composite material of some kind for use in designing aircraft;
3) an increase in susceptibility (sensitivity) to HIRF of electric/electronic systems accompanied by a higher speed of the operating speed of a data bus and a processor, a higher-density of an IC and a card, and a higher degree of sensitivity of electronic equipment;
4) an expansion of use frequency to a high-frequency band of, in particular, 1 GHz and higher;
5) an increase in severity of an HIRF environment with an increase in the number of RF transmitters and electric power; and
6) an adverse affect on part of aircraft when exposed to HIRF environment.

On the other hand, inside an aircraft, due to radio wave and electromagnetic noise (hereinafter simply referred to as electromagnetic noise) emitted from various electronic equipment, such as portable telephones, game machines, notebook-sized personal computers, and PEDs (Personal Electro Devices), such as an active-type RFID (Radio Frequency IDentification) tag attached to air freight cargo, an adverse effect can occur in, for example, communications with a control tower and communications and control of navigation for flight via a predetermined route. Thus, as well known, passengers are asked to refrain from using various electronic equipment inside aircraft.

Since the airframe of an aircraft is generally formed of metal, electromagnetic noise comes and goes from a cabin (a seat space) to a cockpit (a flight deck) and an avionics bay mainly through a cabin window and a cockpit window. Thus, in order to prevent electromagnetic noise that can be a hindrance from entering the cockpit and the avionics bay, a film made of ITO (Indium Tin Oxide), gold, silver, or the like is provided as being inserted to the cabin window made by laminating a plurality of window panels made of acrylic or the like (for example, refer to Japanese Unexamined Patent Application Publication (Translation of PCT Application) No. 2003-523911).

On the other hand, in order to provide the electromagnetic shield, in a cabin window, a conductive film, which transmits light rays, has an electromagnetic shielding performance is held between window panels. Such the conductive film is composed of a film made of ITO, gold, silver, or the like; conductive fibers (Woven Mesh) plated with copper, nickel or the like; a printed mesh formed by printing an ink containing a conductive filler, such as silver on transparent PET (polyethylene terephthalate) or the like; or an expanded metal (mesh made of metal) made of a punched metal plate.

These conductive films to be used for preventing invasion of electromagnetic noise need to be electrically bonded to the airframe. The conductive films are secured onto a retainer mounting frame made of a conductive material, such as aluminum, along the outer perimeter part of the window with an air-tight gasket seal interposed therebetween, by using fastener members, such as clamps, clips or the like made of a conductive material (for example, refer to U.S. Patent Publication No. 2007/0137117 Specification, U.S. Patent Publication No. 2008/0308677 Specification and U.S. Pat. No. 7,913,385 Specification).

The cabin window is mainly formed by using a stretched acrylic material, and the gasket seal is made that is fitted to the entire perimeter of the window is made of an EPDM rubber (ethylene-propylene-diene rubber) or a silicone rubber for the purpose of providing an air-tight sealing property, so as to maintain the air pressure inside the cabin from a low pressure of the outside of the airframe and prevent outside rain and moisture from invading therein.

In this case, however, since the normal EPDM rubber and silicone rubber are non-conductive materials, they have no electromagnetic shielding effect. Therefore, electromagnetic waves make the gasket seal function as if it were an opening slot (an invading inlet for electric waves), and in the case of a high-frequency band with electric waves whose wavelength is a half (½ wavelength) or less, the electromagnetic waves, as they are, transmit through the gasket seal member, and invade into the airframe without being attenuated.

For this reason, a method has been proposed in which by mixing a conductive filler (or particle) such as metal or the like with the gasket seal material so as to have a conductivity so that the conductive film and the retainer mounting frame are electrically connected to each other.

However, in the case when a material having a resistivity different from that of clamp and clip members is adopted as a conductive filler to be used for the gasket seal material, galvanic corrosion due to bonded dissimilar metals tends to occur under a moistened, humid or salt-water atmosphere environment.

Commercial conductive rubbers have a conductive filler derived from metals such as pure Ag, Ag/Cu, Ag/Al, Ni/Cu, Ni/Al, Ag/C, Ni/C or the like, or graphite-carbon (C), mixed therein. Between this conductive rubber seal and a bonding surface of a clamp, a clip or the like made of aluminum on which the conductive rubber seal is bonded, the bonded state of dissimilar metals is formed in most cases, with the result that galvanic corrosion tends to occur under a moistened, humid or salt-water atmosphere environment to cause corrosion in an aluminum material on the airframe side.

As a countermeasure for alleviating the galvanic corrosion due to the bonded state of dissimilar metals, a method is proposed in which the bonding surface of an aluminum material is plated with a material, for example, nickel (Ni), tin (TIN) or chromate in order to avoid the anodic index or potential difference; however, high costs are required for the pretreatment (polishing) of the plating, masking treatments, plating processes, and the like. Another method may be proposed in which the aluminum material is changed to corrosion resistance steel (CRES); however, for use in aircrafts, this method causes more demerits such as heavy weight.

In addition to these, another countermeasure is proposed in which a conductive corrosion-resistant sealant is applied onto the aluminum side; however, this method causes demerits such as time-consuming reapplying processes onto clamps and clips required upon exchanging them at the time of regular equipment inspections.

In this manner, for the respective countermeasures for alleviating galvanic corrosion, exclusively-used treatment processes are additionally required, resulting in high costs or an increase in weight.

Moreover, for example, in automobiles or various equipments, etc. of other fields, also, prevention of electromagnetic waves from invading from the outside has been required for a closing member that closes a window or an opening, and may lead to the same problems as those described above in these parts.

The present invention is devised in view of these technical problems, and has an object of providing a window of an aircraft, a closing member for an opening, and a gasket seal that can positively prevent electromagnetic noise, without causing galvanic corrosion relative to other parts on the periphery thereof.

SUMMARY OF THE INVENTION

For that object, a window of an aircraft to be attached to an opening formed in an airframe of the aircraft according to the present invention includes a window body, a window frame that is to be provided on the inside of the opening and made of a conductive material, a gasket seal that is held between the outer perimeter part of the window body and the window frame, a fastener member that is made of a conductive material, and is used for securing the window body to the airframe with the gasket seal interposed therebetween, and the window body includes a transparent window panel, an electromagnetic shield film that is made of a conductive material and laminated on the window panel, and the gasket seal includes a first seal part that is made of a first conductive rubber-based material and interposed between the window panel and the window frame, and a second seal part that is made of a second conductive rubber-based material having a volume resistivity different from that of the first seal part, and is made in contact with the outer perimeter of the electromagnetic shield film.

In the case when the volume resistivity of the first seal part is made smaller than the volume resistivity of the second seal part, on the first seal part, it is possible to prevent invasion and leakage of electromagnetic noise between the window panel and the window frame, and on the second seal part, it is possible to prevent galvanic corrosion from occurring relative to the fastener member that is made of a conductive material and used for securing the window body to the airframe.

In this case, the volume resistivity of the first seal part may be set to, for example, $10^{-3}$ to 5 $\Omega$cm. The volume resistivity of the second seal part may be set to, for example, 300 to $10^8$ $\Omega$cm. These first and second seal parts are preferably formed into an integral structure by polymeric bonds between the first and second conductive rubber-based materials.

Moreover, the application of the present invention is not limited to the window of an aircraft, and the present invention is applicable to a closing member that closes an opening formed in a product, and is characterized by including a closing member body and a gasket seal that is held between the outer perimeter part of the closing member body and the opening, and the closing member body includes a closing member panel having a panel shape, an electromagnetic shield film that is made of a conductive material, and laminated on the closing member panel, and a fastener member that is made of a conductive material, and used for securing the closing member body to the opening with the gasket seal interposed therebetween, and the gasket seal includes a first seal part that is made of a first conductive rubber-based material and interposed between the closing member panel and the opening, and a second seal part that is made of a second conductive rubber-based material having a volume resistivity different from that of the first seal part, and is made in contact with the outer perimeter part of the electromagnetic shield film.

In this case, a frame made of a conductive material may be provided between the gasket seal and the opening, or may be omitted.

The present invention may be prepared as a gasket seal that is to be held between an opening formed in a product and a closing member that seals the opening, and the gasket seal is characterized by including a first seal part that is made of a first conductive rubber-based material and to be provided on one of surfaces of the closing member, and a second seal part that is made of a second conductive rubber-based material having a volume resistivity different from that of the first seal part, and to be provided on the other surface of the closing member.

According to the present invention, since the gasket seal is formed by a first seal part and a second seal part that are different from each other in the volume resistivity, it is possible to prevent invasion and leakage of electromagnetic wave between the window panel and the window frame or between the closing member and the opening, and it also becomes possible to prevent galvanic corrosion from occurring relative to the fastener member. With this arrangement, by using a light-weight material, it is possible to obtain electromagnetic noise preventive effect and galvanic corrosion suppressive effect easily at low costs.

DETAILED DESCRIPTION OF THE PREFERRED EMBODIMENTS

The present invention is described in detail below based upon preferred embodiments shown in attached drawings.

Figure 1:
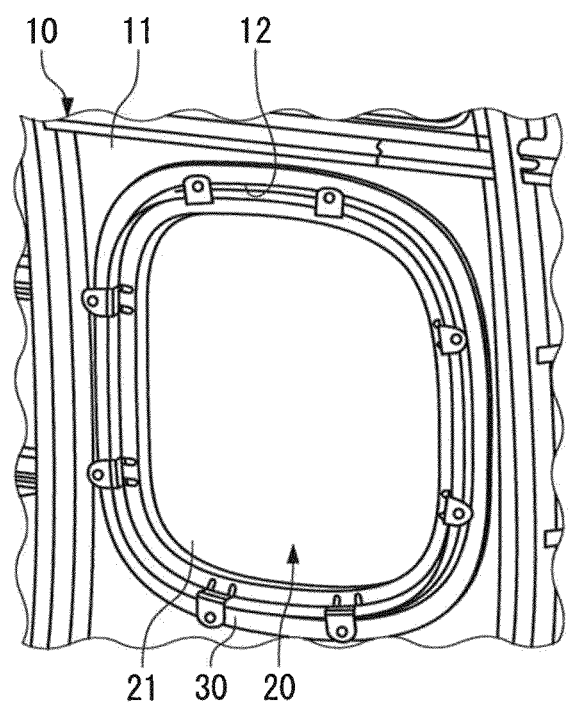
FIG. 1 is a perspective view illustrating an aircraft window in accordance with the present embodiment.

FIG. 1 is a view that explains the structure of a cabin window 20 (window, closing member) of an aircraft 10 (product) in accordance with the present embodiment.

As shown in FIG. 1, the cabin window 20 is provided on the side face of an airframe of the aircraft 10. The cabin window 20 is attached to an opening 12 formed on a skin 11 made of a conductive material forming the airframe of the aircraft 10. The cabin window 20 includes a window part 21 (window body, closing member body) and a window frame 30 that surrounds the entire perimeter part of the window part 21.

Figure 2A:
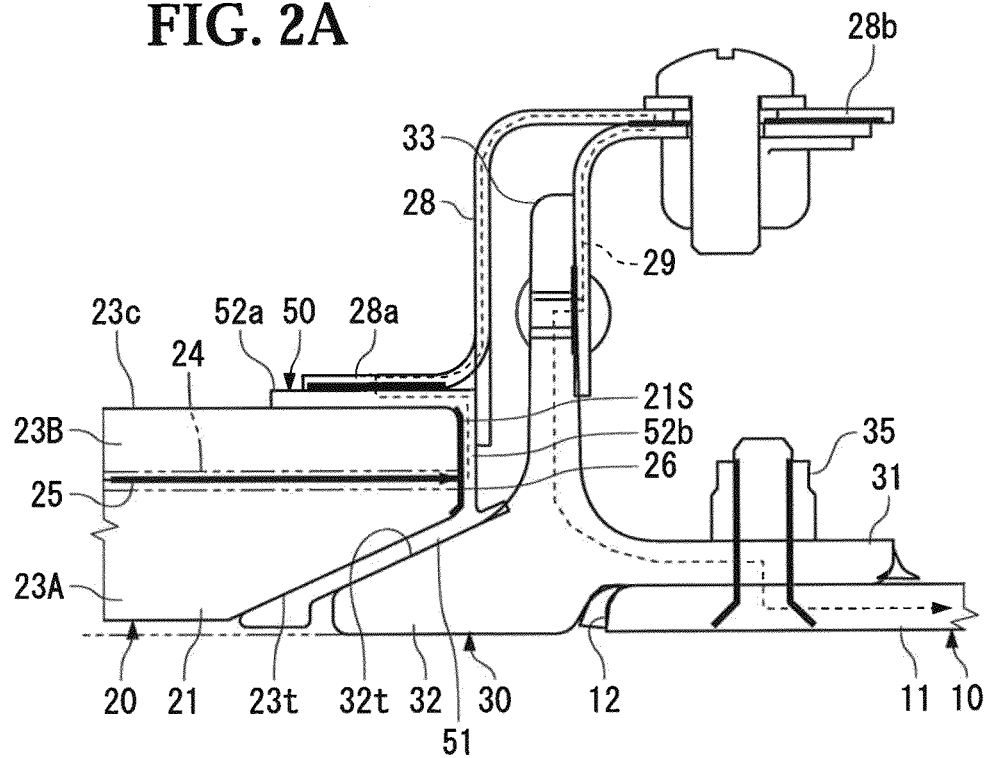
FIG. 2A is a cross-sectional view illustrating the aircraft window and FIG. 2B is a cross-sectional view illustrating a gasket seal.

As shown in FIG. 2A, the window part 21 is configured by laminating a plurality of, two in the present embodiment, window panels (closing member panels) 23A and 23B made of stretched acrylic plates. Here, in the present embodiment, the cabin window 20 has a laminated type structure in which all the window panels 23A and 23B are made of stretched acrylic plates, with a resin film 24, made of polyurethane or the like for use in lamination, being held between the window panels 23A and 23B. In addition to this type, another air-gap-type structure is proposed in which an air layer is placed between the two window panels 23A and 23B.

In this case, the window panel 23A on the outside of the airframe has a tapered portion 23t (outer perimeter part), formed on the perimeter part thereof, that is gradually narrowed from the outside of the airframe toward the inside thereof.

Between the window panel 23A and the resin film 24, an electromagnetic shield mesh (electromagnetic shield film) 25, made of polyester fibers plated with copper (Cu), black nickel (Ni) or the like for use in electromagnetic shielding, is formed. As the electromagnetic shield film, in place of the electromagnetic shield mesh 25, a printed mesh, an expanded metal member made of metal, or a conductive shield thin film made of a conductive material such as ITO, gold, silver, or the like, may also be used.

The electromagnetic shield mesh 25 held by the window panels 23A and 23B has an area equivalent to the window panels 23A and 23B, with its perimeter part exposed to the perimeter part of the window part 21.

A conductive paste 26 is applied onto the entire perimeter of the outer perimeter edge face 21s of the window part 21. With this structure, the electromagnetic shield mesh 25, held by the window panels 23A and 23B, and the conductive paste 26 are electrically connected to each other. Moreover, the conductive paste 26 is designed so as to prevent moisture from invading between the laminated window panels 23A and 23B.

The window frame 30 is made of, for example, an aluminum alloy, and includes a fastener plate part 31 that abuts against the inner perimeter surface of the skin 11, a window panel holding part 32 that is located in an opening formed on the skin 11, and faces the tapered part 23t of the window part 21, and an edge wall part 33 that extends from the window panel holding part 32 toward the inside of the airframe.

The window frame 30, made of a conductive material, such as an aluminum alloy, is fastened to the skin 11 by bolt&nut 35 made of a conductive material in the fastener plate part 31, and is electrically connected to the skin 11 through the bolt&nut 35.

The window panel holding part 32 includes a tapered surface 32t, which faces the inside of the airframe, and is gradually narrowed from the inside of the airframe toward the outside of the airframe.

Between the outer perimeter part of the window panels 23A and 23B and the window frame 30, a gasket seal 50, made of a conductive silicon rubber material, is provided. The gasket seal 50 is formed into a ring shape so as to surround the entire perimeter of the outer perimeter part of the window panels 23A and 23B.

Figure 2B:
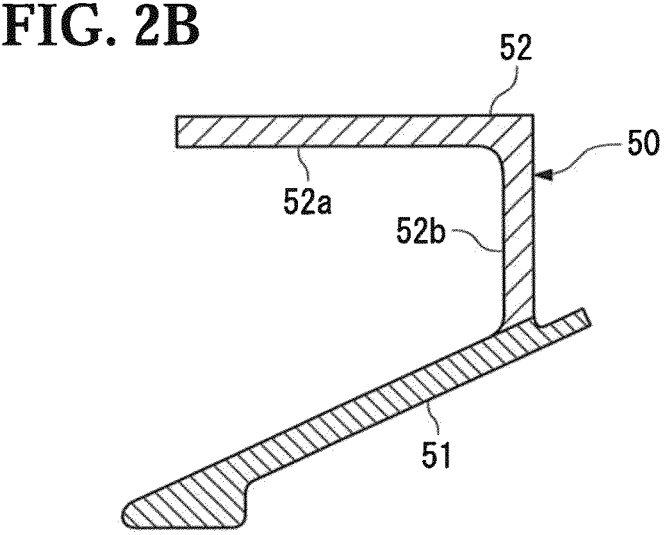

As shown in FIGS. 2A and 2B, the gasket seal 50 includes a first seal part 51 that abuts against the window frame 30, and a second seal part 52 that is placed along the window part 21 inside the airframe.

One surface of the first seal part 51 is formed along the tapered portion 23t of the window panel 23A on the outside of the airframe, and the other surface thereof is formed so as to abut against the tapered surface 32t of the window panel holding part 32.

Moreover, the second seal part 52 has a structure having an L-letter shape in its cross section which is formed by an edge part 52a placed along the airframe inside surface 23c of the window panel 23B and an outer frame part 52b placed along the outer perimeter edge face 21s of the window part 21. In this case, the outer frame part 52b is provided so as to be tightly made in contact with the portion on the outer perimeter edge face 21s of the window part 21 to which the conductive paste 26 is applied.

These first seal part 51 and second seal part 52 are made of conductive rubber materials having mutually different volume resistivities.

The first seal part 51 is made of a first conductive rubber material having a lower volume resistivity than that of the second seal part 52, and the second seal part 52 is made of a second conductive rubber material having a higher volume resistivity than that of the first seal part 51. More specifically, the first seal part 51 is made of a first conductive silicone rubber material having, for example, a volume resistivity of $10^{-3}$ to 5 $\Omega$cm. On the other hand, the second seal part 52 is made of a second conductive silicone rubber material having, for example, a volume resistivity of 300 to $10^8$ $\Omega$cm. As the materials for these conductive silicone rubber materials, for example, conductive EPDM rubber may be used. In order to allow the first seal part 51 and second seal part 52 to have mutually different volume resistivities, mixing ratios of fillers made of conductive materials to be mixed into a silicone rubber material forming a base material, can be made different. The examples of the conductive materials are Ag, Ag/Cu, Ag/Al, Ni/Cu, Ni/Al, C, Ag/C, Ni/C, etc.

Moreover, these first seal part 51 and second seal part 52 are subjected to a curing treatment through thermosetting so that silicone rubbers are polymer-bonded into an integral structure with intermolecular bonding in which they are not separated from each other.

By this gasket seal 50, the electromagnetic shield mesh 25, held between the window panels 23A and 23B, is electrically connected to the second seal part 52 through the conductive paste 26.

The second seal part 52 of the gasket seal 50 is pushed onto the window panel 23B by one end 28a of a clamp (fastener member) 28 having a crank shape that is formed on the rear side of the gasket seal 50. The other end 28b of the clamp 28 is coupled to the edge wall part 33 of the window frame 30 through a clip (fastener member) 29 having an L-letter shape in its cross section. In this case, in the same manner as in the window frame 30, the clamp 28 and the clip 29 are made of, for example, an aluminum alloy, and are electrically connected to the window frame 30.

Thus, the electromagnetic shield mesh 25 is electrically connected to the window frame 30 through the conductive paste 26, the second seal part 52, the clamp 28 and the clip 29.

Additionally, the grounded point by the clamp 28 is assumed to be a minimum point; however, the clamp 28 may have a structure that is continuously placed along the entire perimeter of the gasket seal 50 so as to improve its shielding performance.

In accordance with the above-mentioned structure, the electromagnetic shield mesh 25 is provided on the window part 21, and a gasket seal 50 is installed between the electromagnetic shield mesh 25 and the window frame 30 made of a conductive material. With this structure, since a film made of the conductive material can be formed between the window part 21 and the skin 11, without any electrical gap, it becomes possible to positively prevent electromagnetic noise from invading into the cabin. In this case, the first seal part 51 of the gasket seal 50, interposed between the window part 21 and the window frame 30 on the airframe outside, has a low volume resistivity so that it becomes possible to positively prevent electromagnetic noise from invading into the airframe between the window part 21 and the window frame 30.

Moreover, the electromagnetic shield mesh 25 of the window part 21 is electrically grounded to the window frame 30 through the second seal part 52 of the gasket seal 50, the clamp 28 and the clip 29 on the outer perimeter side of the window panels 23A and 23B. In this case, since the second seal part 52 has a high volume resistivity, it is possible to suppress generation of corrosion in the contact portions to the clamp 28, the clip 29, or the like.

[Embodiments]

Examinations were carried out on the electromagnetic wave attenuation effect, with the volume resistivity of the gasket seal being changed. A gasket seal as shown in FIG. 2 was provided on the outer perimeter of each of two acrylic plates having thicknesses t1=9.5 mm and t2=4 mm, and an external dimension of 248 mm×348 mm, and electromagnetic shielding effectiveness tests were carried out in accordance with IEEE STD-299-2006 "IEEE Standard Method for Measuring the Effectiveness of Electromagnetic Shielding Enclosures". In this case, in addition to a gasket seal of a reference having no conductivity, gasket seals having a volume resistivity of 1.7 Ωcm (Measurement 1), that of 5 Ωcm (Measurement 2), that of 210 Ωcm (Measurement 3), and that of 310 Ωcm (Measurement 4) were prepared. Moreover, as the acrylic plate, except for comparative examples, shield mesh materials composed of polyester fibers of monofilaments copper-plated and black nickel-plated with a surface resistivity of 0.15 Ω/square were stacked and subjected to the tests.

Figure 3A:
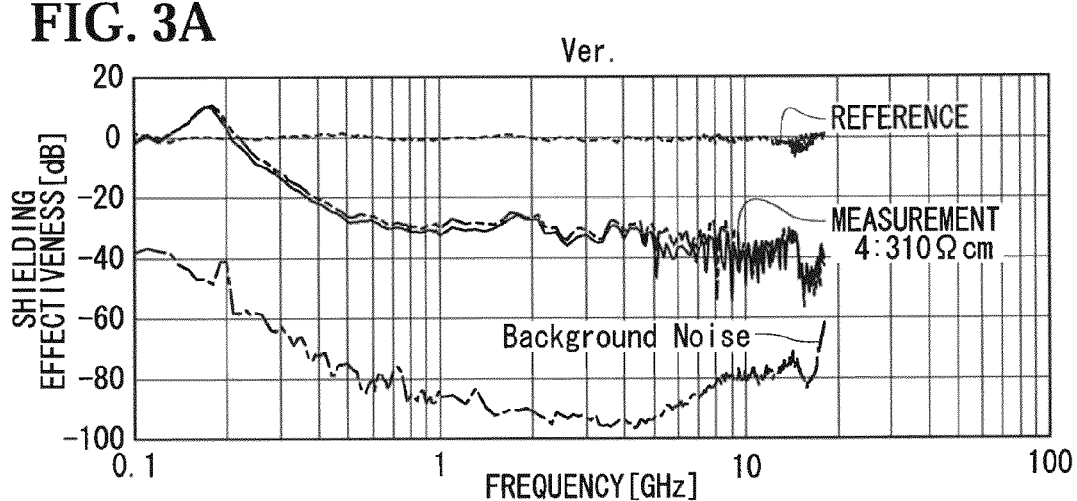
FIGS. 3A to 3C are graphs showing an electromagnetic-shield attenuation effect in the case when the volume resistivity of the gasket seal is changed.
Figure 3B:
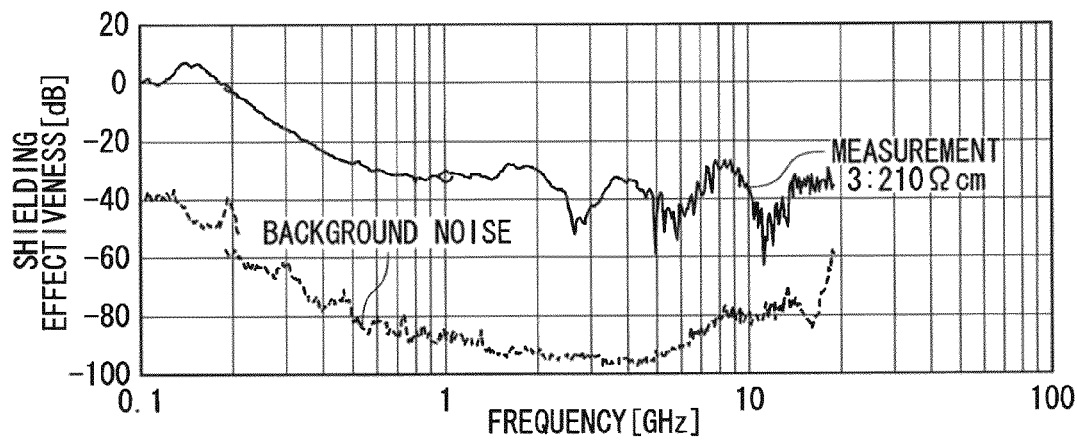
Figure 3C:
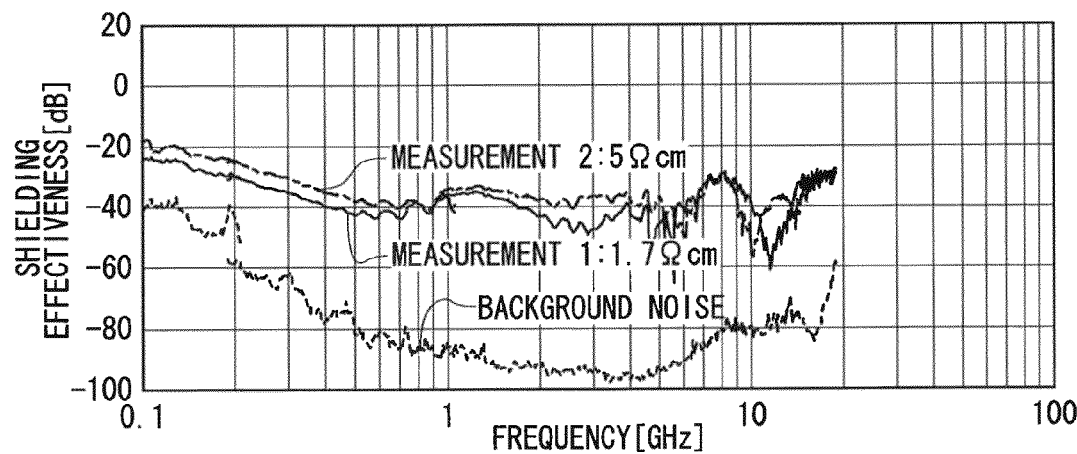

As a result, as shown in FIG. 3, although the attenuation effect was exerted even in Measurements 3 and 4 having high volume resistivity, the attenuation effect was small in a low frequency band. In contrast, in the case when the volume resistivity of the gasket seal was set to 5 Ωcm or less, as in the case of Measurements 1 and 2, an attenuation effect of at least 20 dB or more against electromagnetic waves was obtained over the entire frequency bands from 100 MHz to 18 GHz.

Figure 4A:
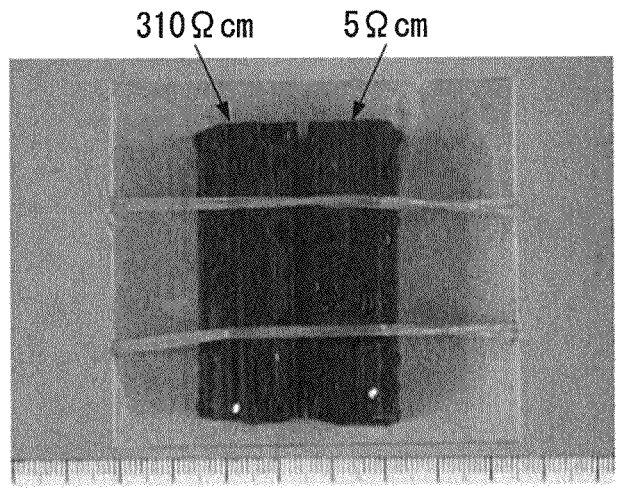
FIG. 4A is a view showing a method of a salt-spray test and FIG. 4B is a view showing the results thereof.

Moreover, with respect to the structures having 5 Ωcm and 310 Ωcm in the volume resistivity of the gasket seal, salt-spray tests were carried out so as to confirm the generation of corrosion. In this test, test pieces of gasket seals having 5 Ωcm and 310 Ωcm in volume resistivity were secured onto a plate made of A2024 aluminum alloy that had been subjected to an Alodine treatment, as shown in FIG. 4A. Onto this, salt water was sprayed over 500 hours. Moreover, 168 hours after the completion of the spraying process, the presence or absence of corrosion on the aluminum plate was confirmed.

Figure 4B:
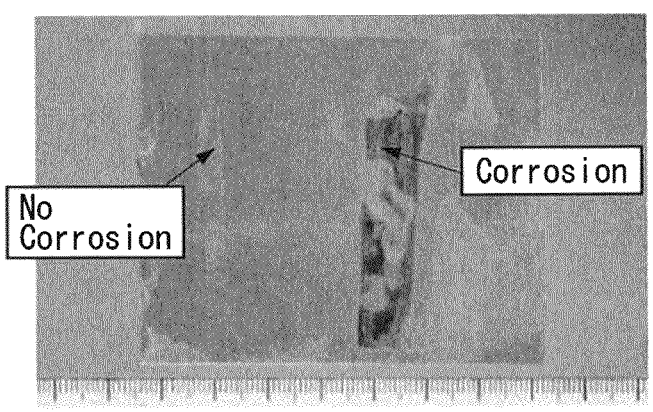

As a result, as shown in FIG. 4B, a portion with which the test piece having 5 Ωcm in volume resistivity was made in contact had a galvanic corrosion; however, no galvanic corrosion occurred at a portion with which the test piece having 310 Ωcm in volume resistivity was made in contact.

As long as the gasket seal has a volume resistivity of 300 Ωcm or more, even in the case when a bonding surface is formed as a portion to which a cabin window is secured, by carrying out a chemical conversion coating process (MIL-DTL-5541 Class 3, MIL-DTL-81706 Class 3) on the surface of an aluminum having electrical conductivity, it is possible to prevent galvanic corrosion from occurring even under moistened, humid or salt-water spraying environment because the conductive rubber material having a high resistivity is used.

Note that the structure as described above can be changed as appropriate without departing from the gist of the present invention. A modification example is now described below. Here, in the modification example below, a structure common to the structure described above is provided with the same reference signs, and its description is omitted.

First, the above-mentioned structures are explained by exemplifying the cabin window 20; however, those structures may also be applied to door windows provided on doors of an aircraft and windows formed on a cockpit and side faces of the cockpit. Moreover, the present invention is also applicable to cases in which pressure seals and gaskets of openings such as doors, escape hatches or the like are made electrically conductive.

Figure 5:
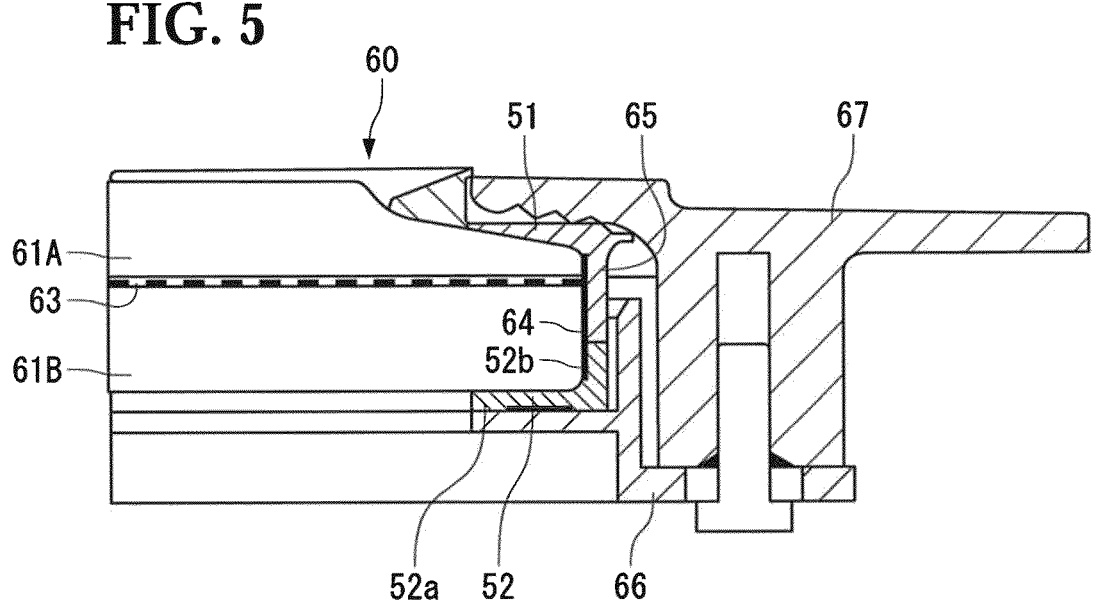
FIG. 5, which shows another example of the present embodiment, is a cross-sectional view illustrating an example in which the present invention is applied to a door window.

FIG. 5 is a view that illustrates a structure in which the present invention is applied to a door window (window, closing member body) 60. As shown in FIG. 5, in the door window 60, the aforementioned electromagnetic shield mesh is held between window panels (closing member panels) 61A and 61B. This structure is the same as the cabin window 20 shown in FIG. 2. With this structure, a gasket seal 65 is electrically connected to a conductive paste 64 so as to be further connected to an end of an electromagnetic shield mesh (electromagnetic shield film) 63 through the conductive paste 64, and the gasket seal 65 includes a first seal part 51 made of a conductive rubber material having a low volume resistivity and a second seal part 52 made of a conductive rubber material having a volume resistivity that is higher than that of the first seal part 51. Thus, the gasket seal 65 is electrically grounded to a window frame 67 through a window retainer 66 (fastener member) along the entire perimeter thereof.

In the above-mentioned structures, each of the first seal part 51 and the second seal part 52 is formed into an integral structure with intermolecular bonding by using a thermosetting curing process; however, not limited to this, these may be formed by using a two-color injection molding process.

Moreover, in the above-mentioned structures, the window panels 23A and 23B are made of a stretched acrylic material; however, these may be made of a polycarbonate resin or glass.

Furthermore, not limited to the application for aircrafts, the present invention may be applicable in the same manner to any case in which an attempt is made to prepare an electromagnetic shielding configuration in a closing member for use in closing an opening, and the application thereof is not intended to be limited. For example, other applications include windows and sunroofs of automobiles, monitors for electronic apparatuses, lens protection filters for various cameras, and the like.

Besides, the structure described in the above embodiment can be selected or can be changed as appropriate to another structure without departing from the gist of the present invention.

What is claimed is:

1. A window of an aircraft attached to an opening formed in an airframe of the aircraft comprising:
a window body;
a window frame that is formed on the inside of the opening and made of a conductive material;
a gasket seal that is held between an outer perimeter part of the window body and the window frame; and
a fastener member that is used for securing the window body to the airframe with the gasket seal interposed therebetween, wherein the window body comprises a transparent window panel, an electromagnetic shield film that is made of a conductive material and laminated on the window panel, and the gasket seal comprises a first seal part that is made of a conductive rubber-based material and interposed between the window panel and the window frame, and a second seal part that is made of a conductive rubber-based material having a volume resistivity different from that of the first seal part and is electrically connected with the outer perimeter part of the electromagnetic shield film, further wherein the first seal part has a volume resistivity that is smaller than the volume resistivity of the second seal part and the first seal part is in direct contact with the window body and the window frame, further wherein the gasket seal has a U-shaped cross-section that comprises a first leg and a second leg, the first leg comprises the first seal part and does not comprise the second seal part, and the second leg comprises the second seal part and does not comprise the first seal part.

2. The window of an aircraft according to claim 1, wherein the first seal part has a volume resistivity in a range of $10^{-3}$ to 5 Ωcm.

3. The window of an aircraft according to claim 1, wherein the second seal part has a volume resistivity in a range of 300 to $10^8$ Ωcm.

4. The window of an aircraft according to claim 1, wherein the first and second seal parts are formed into an integral structure by polymeric bonds between the first and second conductive rubber-based materials.

5. A closing member for closing an opening formed in an airframe of an aircraft comprising:
a closing member body having a panel shape; and
a gasket seal that is held between an outer perimeter part of the closing member body and the opening of the airframe; and
a fastener member that is used for securing the closing member body to the opening of the airframe with the gasket seal interposed therebetween,
wherein the closing member body comprises a closing member panel having a panel shape and an electromagnetic shield film that is made of a conductive material and laminated on the closing member panel, the gasket seal comprises a first seal part that is made of a first conductive rubber-based material and interposed between the closing body panel and the opening of the airframe, and a second seal part that is made of a second conductive rubber-based material having a volume resistivity different from that of the first seal part and is electrically connected with the outer perimeter part of the electromagnetic shield film,
further wherein the first seal part has a volume resistivity that is smaller than the volume resistivity of the second seal part and the first seal part is in direct contact with closing member body and the opening,
further wherein the gasket seal has a U-shaped cross-section that comprises a first leg and a second leg, the first leg comprises the first seal part and does not comprise the second seal part, and the second leg comprises the second seal part and does not comprise the first seal part.

6. A gasket seal to be held between an opening formed in an airframe of an aircraft and a closing member for use in closing the opening comprising:
a first seal part that is made of a first conductive rubber-based material and is to be provided on one of surfaces of the closing member, and a second seal part that is made of a second conductive rubber-based material having a volume resistivity different from that of the first seal part, and is to be provided on the other surface of the closing member such that the second seal part is electrically connected to an electromagnetic shield film of the closing member,
further wherein the first seal part has a volume resistivity that is smaller than the volume resistivity of the second seal part and the first seal part is in direct contact with the closing member and the opening,
further wherein the gasket seal has a U-shaped cross-section that comprises a first leg and a second leg, the first leg comprises the first seal part and does not comprise the second seal part, and the second leg comprises the second seal part and does not comprise the first seal part,
further wherein the gasket seal is held between an outer perimeter part of the closing member and the opening of the airframe.

7. The window of an aircraft according to claim 1, wherein the second seal part is in contact with the fastener member and the first seal part is not in contact with the fastener member.

8. The window of an aircraft according to claim 1, wherein the window frame comprises a window panel holding part having a tapered surface that faces an inside of the airframe.

9. The window of an aircraft according to claim 8, wherein the first seal part is in contact with the window panel and the tapered surface.

10. The window of an aircraft according to claim 8, wherein the tapered surface faces a tapered part of the window body and the first seal part is in contact with the tapered part and the tapered surface.

11. The window of an aircraft according to claim 1, wherein the window frame surrounds an entire perimeter of the window body.

12. The window of an aircraft according to claim 1, wherein the gasket seal surrounds an entire perimeter of the window panel.

13. The window of an aircraft according to claim 1, wherein the fastener member comprises a clamp that is in contact with the second seal part and extends around an entire perimeter of the gasket seal.

14. The window of an aircraft according to claim 1, wherein the gasket seal is formed into a ring shape circumscribing an axis, further wherein the gasket seal has a U-shaped cross-section that opens towards the axis.

15. The window of an aircraft according to claim 14, wherein the second seal member comprises a surface that contacts the outer perimeter part of the electromagnetic shield film and faces the axis.

* * * * *